United States Patent [19]
Leopold, Jr.

[11] 3,819,207
[45] June 25, 1974

[54] METER RISER ASSEMBLY

[75] Inventor: Wilbur R. Leopold, Jr., Decatur, Ill.

[73] Assignee: Mueller Co., Decatur, Ill.

[22] Filed: Feb. 5, 1973

[21] Appl. No.: 329,335

[52] U.S. Cl................... 285/45, 285/174, 285/369
[51] Int. Cl............................................. F16l 55/00
[58] Field of Search............ 285/174, 423, DIG. 10, 285/DIG. 20, 45, 55, 369, 305

[56] References Cited
UNITED STATES PATENTS

| | | | |
|---|---|---|---|
| 2,646,822 | 7/1953 | Ferguson | 285/55 |
| 3,108,826 | 10/1963 | Black | 285/174 |
| 3,348,862 | 10/1967 | Leopold | 285/174 X |
| 3,565,468 | 2/1971 | Garrett | 285/423 X |
| 3,606,402 | 9/1971 | Medney | 285/423 X |

FOREIGN PATENTS OR APPLICATIONS

| | | | |
|---|---|---|---|
| 1,097,192 | 12/1967 | Great Britain | 285/305 |

*Primary Examiner*—Alfred R. Guest
*Attorney, Agent, or Firm*—Cushman, Darby and Cushman

[57] ABSTRACT

A meter riser assembly for use in connecting a fluid meter with a plastic service line, the meter riser assembly including a plastic transition body fitting bonded to the plastic service line, and a metal pipe adapted for connection at one end to the meter and at the other end to the body fitting, the metal pipe being coated with a corrosive resistant coating to protect it from weather and ground elements. An O-ring provides a seal between the exterior of the coated metal pipe and the interior of the body fitting whereas a flexible rod made of softer material than the pipe coating is inserted through a hole in the fitting into a groove between the fitting and the pipe for retaining the pipe in the fitting while permitting relative rotation between the members.

10 Claims, 7 Drawing Figures

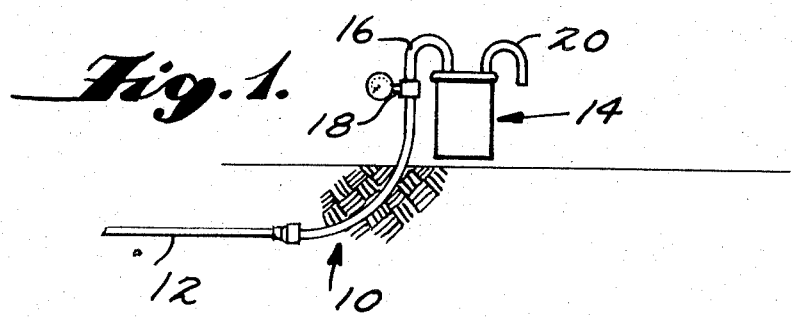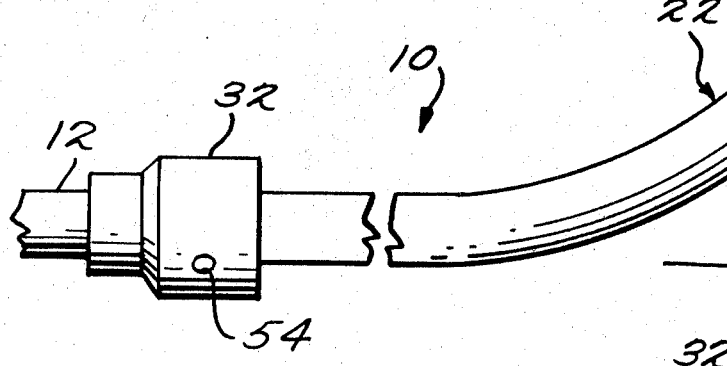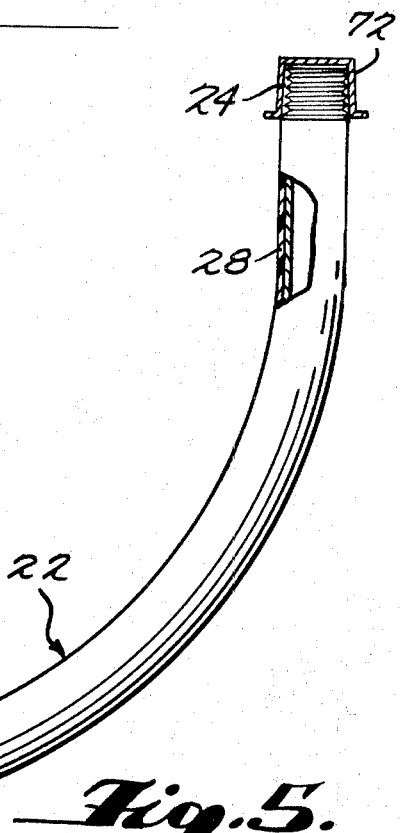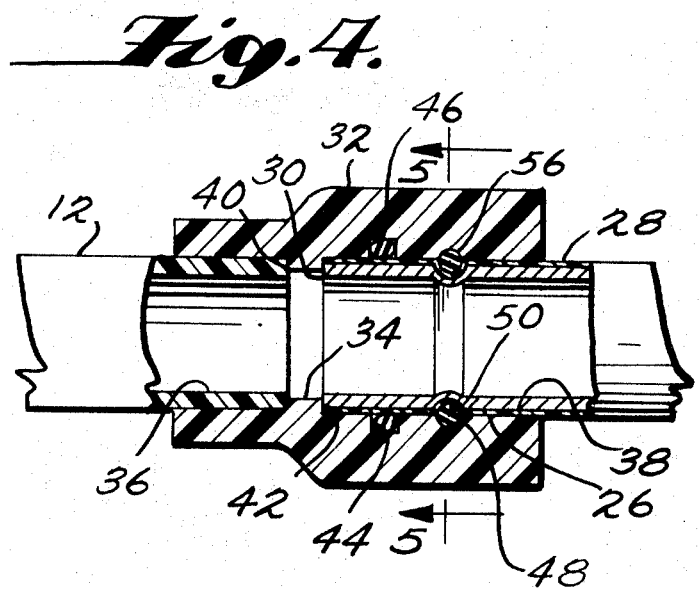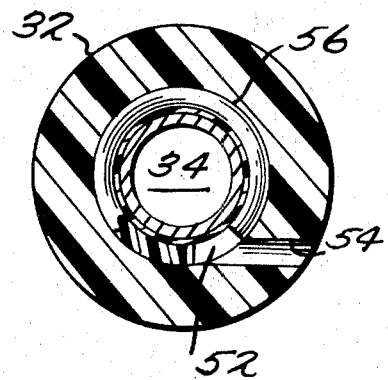

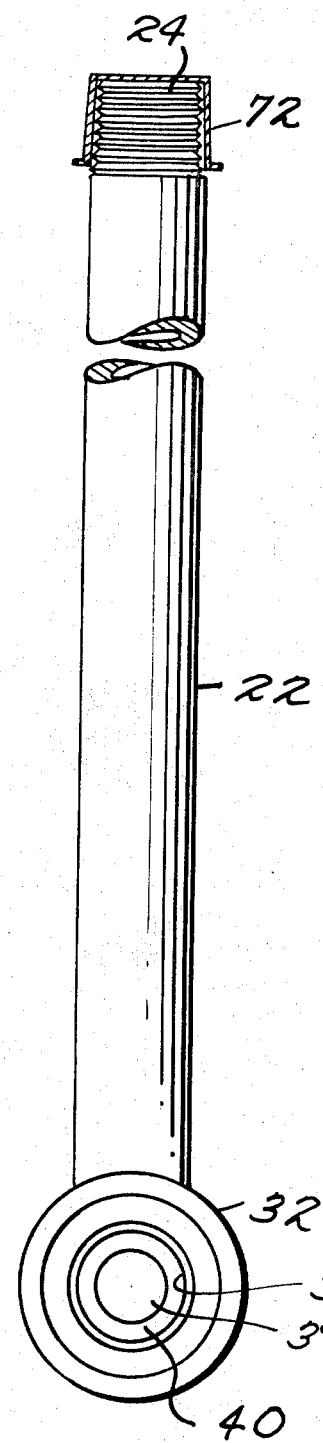
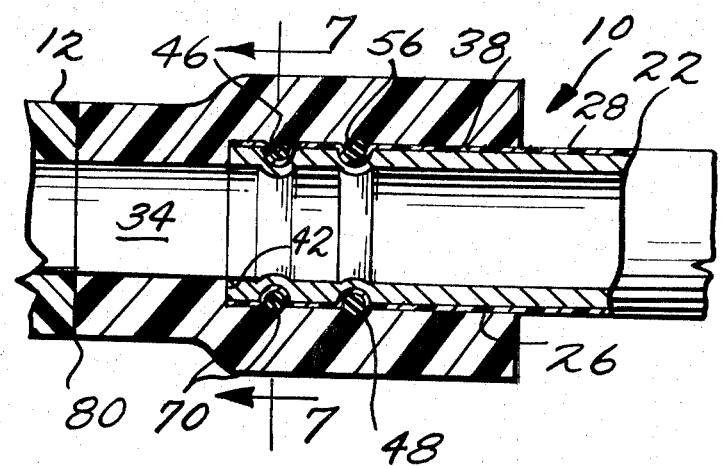
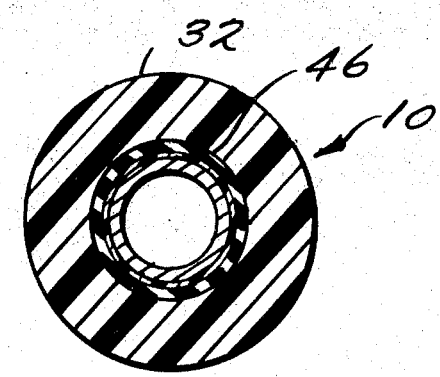

METER RISER ASSEMBLY

The present invention relates to an improved meter riser assembly for use in connecting a plastic service line extending from a fluid main such as a gas main to a fluid meter.

BACKGROUND OF THE INVENTION

Until recent years service lines extending from gas mains were metal and were connected by transition fittings to riser pipes, the riser pipes being metal such as steel extending upwardly out of the ground and operatively connected to the fluid meter. In some instances the riser pipes helped to support the meter. This type of installation proved satisfactory with the exception that the service lines and riser pipes occasionally corroded and had to be replaced. More recently service lines made of plastic have been used, the same being made from polyethylene (PE), polyvinyl chloride (PVC) and the like. While this eliminated corrosion problems, a new problem arose in connecting the plastic service line with the transition fittings to the meter riser pipe. In the past, the transition fittings have been made of plastic and have been bonded to the plastic service line by heat fusion, solvent welding, friction welding or the like. The steel meter riser pipe was then adhesively bonded to the plastic transition fitting but this has not proved entirely successful because of the lack of give in the bond due to torsion stresses in the completion of the assembly and the shifting of earth after assembly.

Another form of meter riser assembly utilized a steel body transition fitting which extended over the end of the plastic service line and then a steel liner was wedged into the plastic service line to retain the body on the same. The meter riser pipe then had to be welded to the steel body. This type of arrangement was subject to leaks from cold flow of the plastic.

In addition to the above there have been somewhat similar joints made for pipes utilizing transition fitting but most of these joints have required two seals and most of the same did not permit adaptability of orientation in installation of a meter or the elimination of torsion stresses after installation. Typical prior art is shown in the following patents:

| | | |
|---|---|---|
| 2,436,407 | Stephens | Feb. 24, 1948 |
| 2,597,482 | Harrison et al. | May 20, 1952 |
| 2,646,822 | Ferguson | July 28, 1953 |
| 1,097,192 British | Boers | |
| 1,204,894 German | Hemscheidt | |

BRIEF SUMMARY OF THE INVENTION

The present invention relates to an improved meter riser assembly for connecting a fluid meter to a plastic service line. The meter riser assembly includes a plastic transition fitting bonded to the end of a plastic service line and to a metal riser pipe having threads on one end with the other end smooth for reception in the fitting, the pipe being coated with a corrosive resistant coating at least on its exterior surface from the threads to the smooth end. An O-ring seal carried either in a groove in the plastic transition fitting or a groove on the exterior of the smooth end of the riser pipe seals the interior of the pipe from the exterior moisture. In other words, the entire meter riser assembly is non-corrosive. A retaining rod made of softer material than the coating on the pipe is positioned in an annular passage defined by a groove on the exterior of the riser pipe and the interior of the transition fitting. By making the retaining rod of softer material than the coating there can be no damage to the coating upon assembly of the rod in the passage. The retaining rod prevents axial movement of the riser pipe from the fitting once assembled but permits relative rotation so that torsion stresses can be reduced to a minimum when the meter is installed on the riser pipe and also this arrangement permits proper orientation of the riser pipe to its desired location for connection with the meter.

BRIEF DESCRIPTION OF THE DRAWINGS

FIG. 1 is a schematic view of the meter riser assembly of the present invention attached to a fluid meter and to a plastic service line extending from a main.

FIG. 2 is an enlarged side elevational view of the meter riser assembly with a portion of the meter riser pipe broken away to show the coating thereon.

FIG. 3 is an enlarged elevational view looking from the left of FIG. 2 toward the right and with the service line removed.

FIG. 4 is a vertical sectional view taken through the joint of the meter riser assembly.

FIG. 5 is a sectional view taken on the line 5—5 of FIG. 4.

FIG. 6 is a view similar to FIG. 4 but showing a modified construction of meter riser assembly.

FIG. 7 is a view taken on the line 7—7 of FIG. 6.

DETAILED DESCRIPTION OF THE INVENTION

Referring to the drawings wherein like character and reference numerals represent like or similar parts, there is disclosed in FIG. 1 a meter riser assembly generally designated at 10 which extends from a plastic service line 12 to a fluid meter assembly 14. The plastic service line 12 is made from polyethylene (PE) or polyvinyl chloride (PVC) or any other suitable plastic material and it extends from the main (not shown) which may be a gas. The meter assembly 14 has an inlet conduit 16 connected to the meter riser assembly 10 through a pressure regulator unit 18 and an outlet conduit 20 which extends into a dwelling and is connected to the appliances therein.

As best shown in FIGS. 2, 3 and 4, the meter riser assembly 10 includes a meter riser pipe 22 which is arcuate in shape and made of metal such as steel, the meter riser pipe 22 being threaded at one end as indicated at 24 and smooth at the other end as indicated at 26. A suitable corrosive resistant coating 28 is provided on the meter riser pipe 22 at least from the threads 24 to its terminal end 30 (FIG. 4). Typical coating materials which function to make the meter riser assembly non-corrosive are Scotchkote 202 Protective Resin by 3M Co.; Corvel Fusion Bond Epoxy Resin Coating by The Polymer Corporation; Keysite 740 Epoxy Paint by Socco Plastic Coating Co.; Gilpon Epoxy Paint by Gilman Paint Co.; and Dutch Boy Epicote 100 Epoxy by National Lead Company.

The coating thickness range for the coating 28 is from 5 mils to 15 mils depending upon the particular coating material used. The meter riser assembly 10 also includes a rigid plastic transition body fitting 32 made of polyethylene (PE) or polyvinyl chloride (PVC) or some other suitable plastic material which can be easily bonded to the plastic service line 12. In more detail the transition fitting 32 has a throughbore 34 with a first counterbore 36 at one end and a second counterbore 38 at the other end. The counterbores 36 and 38 respectively have at their inner ends outwardly facing annular shoulders 40 and 42 which function as stops for the plastic service line 12 and the meter riser pipe 22. Plastic service line 12 is bonded to the surface of the counterbore 36 by any suitable bonding means such as heat fusion bonding, solvent welding or friction welding. Preferably when polyethylene (PE) is used for the fitting 32 and for the plastic service line 12 then the bonding will be by heat fusion.

The second counterbore 38 has a diameter just sufficient to receive the smooth end portion 26 of the coated riser pipe 22. It will be noted by reference to FIG. 4 an annular groove 44 is spaced from the outwardly facing shoulder 42 of the second counterbore 38 and it receives a sealing ring such as an O-ring 46. The arrangement of the O-ring 46 sealing between the surface of counterbore 38 and the coating 28 protects the interior of riser pipe 22 from any corrosion. Outwardly of the annular groove 44 the counterbore 38 is provided with a second annular groove 48 which mates with an annular groove 50 rolled into the smooth coated end portion 26 of the pipe 22. As shown in FIG. 5 these two grooves define an annular passage 52. An opening or hole 54 is provided in the transition fitting 32, the opening 54 extending from the surface of the fitting to and being in communication with the passage 52 on a tangent to the same.

A flexible retaining rod 56 made of a softer material than the coating 28 is inserted through the opening into the passage 52 once the meter riser pipe has been slipped into position in the counterbore 38 of the fitting 32. The flexible retaining rod 56 has a length which is less than the circumference of the annular passage 52 so that the end of the rod 56 does not extend into the opening 54 when the rod is properly positioned. This rod 56 locks the meter riser pipe 22 to the transition fitting 32 so that it cannot be pulled axially therefrom but the arrangement permits complete 360° rotation of the meter riser pipe 22 relative to the transition fitting 32. As mentioned heretofore, the retaining rod 56 must be of a softer material than the coating 28 on the riser pipe 22 so that it cannot scratch or damage the coating during insertion. Preferably nylon is used when the above-mentioned typical coatings for the riser pipe 22 are used.

Referring now to FIGS. 6 and 7, there is disclosed a modified version of the meter riser assembly 10. The difference in this arrangement is that the second counterbore 38 is provided with only one annular groove 48, the groove for the O-ring 46 being provided in the coated end portion 26 of the riser pipe 22 as indicated at 70. A further difference may be noted in that the service line 12 is butt fused to the fitting 32 as indicated at 80 rather than provided with a socket type joint. Of course, the butt joint could be used with the arrangement of FIG. 4 if desired. Other than this, the assemblies are identical and consequently the same numerals have been used except for the different grooves.

The riser assembly 10 may be shipped to the user ready for installation and in this respect a plastic cap 72 is provided over the threads 24 to protect the same in shipment. When the assembled unit including the riser pipe 22 and the fittings 32 are received at the site of use, it is merely necessary to slide the transition fitting 32 onto the end of the service line and suitably bond the two together. Then the riser pipe can be rotated to properly align it to a position where the meter is to be hung. Then the riser assembly 10 can be connected to the meter 14. By such an arrangement there can be compensation for torsion which may result from freezing and thawing of the ground since the riser pipe 22 can always have some rotation relative to the service line 12 through its connection, namely, the transition fitting 32. While the riser assembly 10 may be shipped as a unit, its parts can also be shipped individually and then assembled at the site. In some instances it may be desirable to bond the transition fitting 32 to the service line 12 prior to insertion of the riser pipe 22 into the fitting. In this situation, the O-ring 46 would be fully protected from the bonding operation as it could be inserted after completion of the same.

The terminology used in this specification is for the purpose of description and not limitation, the scope of the invention being found in the claims.

What is claimed is:

1. A meter riser assembly for connecting a fluid meter to a plastic service line comprising:

a plastic transition body fitting having a throughbore with a counterbore at least at one end of the throughbore, means at the other end of said throughbore to bond the service line to the body fitting, said counterbore having an outwardly facing annular shoulder at its inner end and an annular groove in its wall between the shoulder and the end thereof, said fitting having an opening extending from the exterior surface thereof to and communicating with said annular groove substantially on a tangent thereof;

a metal riser pipe having means at one end for operative connection to the fluid meter and having the other end thereof smooth for reception into said counterbore of said fitting in an abutting relationship with the outwardly facing shoulder thereof, said metal pipe having a thin protection coating at least on its exterior surface extending from said means to its smooth end, an external groove on said pipe and its coating which cooperates with the groove in said counterbore to define an annular passage;

a flexible retaining rod made of a softer material than said coating on said pipe and inserted through the opening in said fitting and positioned in said annular passage to lock said pipe against axial movement in said bore of said fitting while permitting relative rotation between the pipe and the fitting; and sealing means between said counterbore and the coating of said pipe, said sealing means being positioned inwardly of said passage with said rod therein.

2. A meter riser assembly as claimed in claim 1 in which said corrosive protection coating on the surface of said pipe has a thickness in the range of 5 mils to 15 mils.

3. A meter riser assembly as claimed in claim 2 in which said sealing means includes an annular groove in said counterbore of said fitting and an O-ring in said annular groove.

4. A meter riser assembly as claimed in claim 2 in which said sealing means includes an annular groove in the coating and wall of said pipe and an O-ring in said groove.

5. A meter riser assembly as claimed in claim 1 in which said retaining rod is made of nylon.

6. A meter riser assembly as claimed in claim 1 in which said fitting is made from polyvinyl chloride and in which the service line is made from polyvinyl chloride.

7. A meter riser assembly as claimed in claim 1 in which said fitting is made from polyethylene.

8. A meter riser assembly as claimed in claim 1 in which said metal pipe is arcuate in shape and in which said means on the end of the same for operatively connecting the pipe to the fluid meter is a thread which is uncoated.

9. A meter riser assembly as claimed in claim 1 in which said means at the other end of said throughbore includes a second counterbore having an outwardly facing shoulder at its inner end and being arranged to have an end portion of the plastic service inserted therein in abutting relationship with shoulder and bonded thereto.

10. A meter riser as claimed in claim 1 in which said means at the other end of said throughbore includes a butt joint between the service line and the body fitting.

* * * * *